W. LUTOSTANSKI.
AUXILIARY SEAT FOR BABY CARRIAGES.
APPLICATION FILED JAN. 16, 1917.
1,235,347.
Patented July 31, 1917.
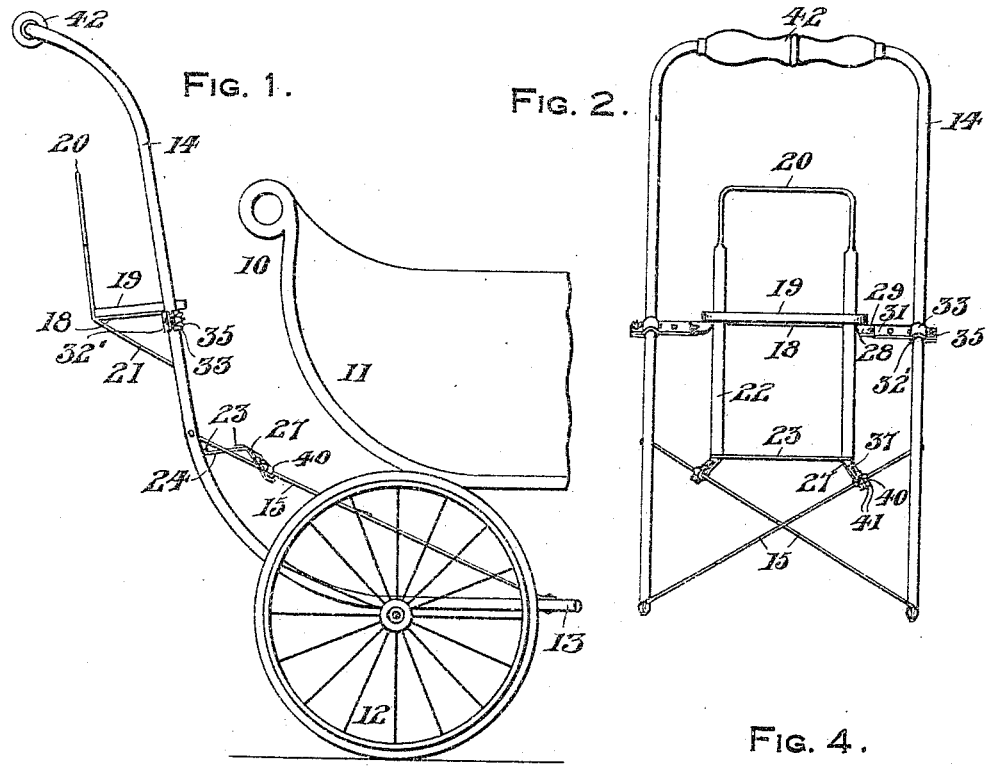

UNITED STATES PATENT OFFICE.

WLADYSLAW LUTOSTANSKI, OF NEW YORK, N. Y.

AUXILIARY SEAT FOR BABY-CARRIAGES.

1,235,347.           Specification of Letters Patent.      Patented July 31, 1917.

Application filed January 16, 1917. Serial No. 142,666.

*To all whom it may concern:*

Be it known that I, WLADYSLAW LUTOSTANSKI, a subject of the Emperor of Austria, residing at New York city, in the county of New York and State of New York, have invented certain new and useful Improvements in Auxiliary Seats for Baby-Carriages, of which the following is a specification.

This invention relates to new and useful improvements in auxiliary seats for baby carriages.

The primary object of the invention is the provision of a child's seat readily attachable to any of the ordinary forms of baby carriages, push-carts, or go-carts, whereby a young child may be wheeled about after becoming too old to ride in the vehicle in the ordinary manner and which may then be occupied by another child.

A further object of the invention is the provision of an auxiliary seat having adjustable mounting means for detachably connecting the same in supported position upon any desirable structure, such as the rear portion of a baby carriage.

A still further object of the device is the provision of a seat attachment that is easy and inexpensive to manufacture and is provided with adjustable mounting members whereby the same may be easily attached to frame structures of different shapes and dimensions.

In the drawing forming a part of this application and in which like designating characters refer to corresponding parts throughout the several views, Figure 1 is a side elevation of a rear portion of a baby carriage provided with the present device, Fig. 2 is a rear elevation thereof, parts being omitted, Fig. 3 is a perspective view of the device detached, Fig. 4 is a top plan view of a portion of the seat-mounting frame of the device with one of the adjacent adjustable clamping members shown in longitudinal section, Fig. 5 is an enlarged elevational view of the other form of clamping device employed with the structure, and Fig. 6 is a central longitudinal sectional view of the latter.

The present invention in anxuliary seats for vehicles is herein illustrated in connection with a baby carriage 10 of the usual form having a carriage body or basket 11 mounted upon wheels 12, the frame 13 of the vehicle having a double curved yoke-shaped handle portion 14 provided with diagonally arranged brace rods 15. The auxiliary seat is in the form of a two-step frame 16 formed of flat metallic strips, the lower step 17 constituting a foot rest and the intermediate or upper step 18 forming a mount for the bottom or seat board of the device.

The frame has an arched upper extremity 20 forming the back of the seat, while bracing struts 21 connect the bottom mount 18 with the lower upright portions 22 of the frame, the foot support 17 being formed of parallel strips 23 connecting the opposite side portions 24 of the frame which projects angularly from the upright portions 22 thereof.

A special form of clamps is arranged for attaching the device to a baby carriage, opposite clamp members 25 being carried by the seat mount 18 for engaging the sides of the vehicle handle 14, while differently formed clamps 26 are carried by outwardly extending angular projections 27 of the lower frame portions 24. Projecting arms 28 are carried by the bottom mount 18, arranged with longitudinal slots 29 adapted for the sliding reception of a terminal lug 30 upon a clamp bar 31 and a securing bolt 32 carried by the adjacent bar 31. The outer free end of each bar 31 is provided with a two-part cylindrical clamp, one portion 32' of which is integral with the bar 31, while the opposite coöperating portion or jaw 33, of similar form, is hinged to the bar 31 as at 34, while a locking bolt 35 is adapted to maintain the members 32' and 33 in locking engagement with the adjacent sides of the handle 14 of the carriage. The arrangement of the lug 30 within the slot 29 prevents any relative rotation of the clamp 25 upon the said arm.

It will be seen that by adjusting the bar 31 the clamp 25 may be readily adjusted upon the vehicle handle 14, the connection of the bar 31 with the arms 28 permitting such attachment with handles of different widths, it being understood that the bar 31 and locking bolt 35 are tightened upon the respective parts for holding the same in locked position. Each clamp 26 consists of a plate 36 having a slot 37 for receiving a bolt 38 carried by the adjacent frame extension 27 whereby the plate 36 is adjustably swiveled upon such extension. A socket 39 is provided adjacent the free end of each plate 36 adapted for coöperating with a correspondingly formed clip 40 attached to the said plate by means of set screws 41, whereby a bar, such as one of the brace rods 15, is adapted to be secured therein.

The complete operation of the device will be at once apparent from this detailed description of the several elements thereof. The clamps 25 are secured to the opposite portions of the handle 14, while the clamps 26 are shifted and adjusted into locked engaging positions with the adjacent brace rods 15, thereby securely mounting the device upon the vehicle handle 14 with the seat bottom 19 and foot rest 17 substantially horizontal. It will be understood that the vehicle is moved as desired by the operator thereof grasping the hand holds 42 at the upper end of the handle 14, the auxiliary seat being adapted to hold a child in convenient position for grasping the sides of the handle 14, being rearwardly of the carriage body 11 and substantially within the inclosure of the handle 14.

What I claim as new is:

1. In combination with a baby carriage having a looped handle and diagonal brace rods therebetween, a seat frame formed of metallic strips of a double step formation providing a seat bottom mount and a foot rest arranged in parallel planes and further providing an arched back at the upper extremity of the frame adjacent the said mount, a seat board upon the said mount, projecting slot arms oppositely carried by the mount, bars adjustably arranged longitudinally of the said arms having terminal lugs positioned within the slots thereof, locking bolts carried by the said bars extending through the slots of said arms, adjustable encircling clamps at the outer ends of said bars, adapted for detachable connection with the opposite sides of the said handle when the device is mounted upon the said vehicle.

2. In combination with a baby carriage having a looped handle and diagonal brace rods therebetween, a seat frame formed of metallic strips of a double step formation, providing a seat bottom mount and a foot rest arranged in parallel planes and further providing an arched back at the upper extremity of the frame adjacent the said mount, a seat board upon the said mount, projecting slot arms oppositely carried by the mount, bars adjustably arranged longitudinally of the said arms having terminal lugs positioned within the slots thereof, locking bolts carried by the said bars extending through the slots of said arms, adjustable encircling clamps at the outer ends of said bars, adapted for detachable connection with the opposite sides of the said handle when the device is mounted upon the said vehicle, downwardly projecting terminal extensions at the forward corners of the said foot supports, slotted plates flatly contacting the said extension, swiveled bolts carried by said extension adjustably arranged through the slots of the said plates, and an adjustable clamp at the free end of each of said plates adapted for detachable connection with the adjacent brace rod of the vehicle.

In testimony whereof I affix my signature.

WLADYSLAW LUTOSTANSKI.

In the presence of—

HARRY STEINBOCK.

Copies of this patent may be obtained for five cents each, by addressing the "Commissioner of Patents, Washington, D. C."